(12) United States Patent
Wakui

(10) Patent No.: US 6,525,895 B2
(45) Date of Patent: *Feb. 25, 2003

(54) REPRODUCING APPARATUS

(75) Inventor: Tetsuya Wakui, Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/625,100

(22) Filed: Apr. 1, 1996

(65) Prior Publication Data

US 2001/0002156 A1 May 31, 2001

(30) Foreign Application Priority Data

May 26, 1995 (JP) ............................... 7-152634

(51) Int. Cl.[7] ............................................. G11B 15/12
(52) U.S. Cl. ........................................................ 360/62
(58) Field of Search ........................... 369/134; 360/60, 360/61, 62, 63, 10.3, 38.1, 74.4, 72.3, 69, 74.1; 386/9, 39, 76

(56) References Cited

U.S. PATENT DOCUMENTS

| | | | | |
|---|---|---|---|---|
| 4,403,262 A | * | 9/1983 | Ito et al. ................... 360/69 X |
| 4,445,151 A | * | 4/1984 | Kinoshita et al. .............. 360/27 |
| 4,494,158 A | * | 1/1985 | Fujibayashi ................... 360/69 |
| 4,559,567 A | * | 12/1985 | Maruichi et al. ........... 386/10.3 |
| 4,766,507 A | * | 8/1988 | Kashida et al. ......... 360/74.4 X |
| 4,811,370 A | * | 3/1989 | Yamada et al. ............ 360/69 X |
| 4,860,129 A | * | 8/1989 | Fukuda et al. ................. 360/61 |
| 5,208,865 A | * | 5/1993 | Friske et al. ................... 381/94 |
| 5,337,196 A | * | 8/1994 | Kim .............................. 360/30 |

* cited by examiner

Primary Examiner—David Hudspeth
Assistant Examiner—K. Wong
(74) Attorney, Agent, or Firm—Robin, Blecker & Daley

(57) ABSTRACT

A reproducing apparatus for reproducing an information signal recorded on a recording medium is provided with a reproducing part arranged to reproduce the information signal recorded on the recording medium and to output the reproduced information signal, a muting circuit for muting the information signal outputted from the reproducing part, a detecting circuit for detecting the level of a noise component included in the information signal outputted from the reproducing part, and a control part for controlling a muting action of the muting circuit on the basis of a result of detection provided by the detecting circuit. These parts in combination enable the reproducing apparatus to reproduce the information signal without generating any noise component, in a minimal length of time after the commencement of reproduction.

4 Claims, 3 Drawing Sheets

REPRODUCING APPARATUS

BACKGROUND OF THE INVENTION

1. Field of the Invention

This invention relates to a reproducing apparatus for reproducing an information signal recorded on a recording medium.

2. Description of the Related Art

FIG. 1 shows in outline and by way of example a typical arrangement of the conventional FM (frequency modulation) recording type video tape recorder (hereinafter abbreviated to VTR).

Referring to FIG. 1, the conventional VTR is provided with a transport mechanism 21 for transporting a tape T which is a recording medium, an amplifier 22 arranged to amplify a signal reproduced from the tape T, a demodulation circuit 23 arranged to bring the signal outputted from the amplifier 22 back into an original audio signal, a muting circuit 24 arranged to remove any noise from the audio signal, a control part 25 arranged to control the transport mechanism 21, an instructing part 26 arranged to instruct the control part 25 and the muting circuit 24 to perform their actions, and an output terminal 27.

In the conventional arrangement, when the instructing part 26 issues an instruction for reproduction, the control part 25 initiates control to have a signal outputted to the amplifier 22 by causing the transport mechanism 21 to act. The instructing part 26 begins to count time when the instruction is issued to the control part 25 and instructs the muting circuit 24 to perform a muting action until a predetermined number is counted, so that neither audio signal nor noise, therefore, appear at the output terminal 27. When the count reaches the predetermined count number, the instructing part 26 sends out an instruction for canceling the muting action to allow an audio signal to be outputted from the output terminal 27. The muting time for which noises are to be suppressed is set at a length of time which is a little longer than a maximum operation stabilizing time determined by a mechanism part of the VTR and a control part performing control over the mechanism part. Therefore, generation of noises can be prevented as there is provided always a sufficiently wide time margin before canceling the muting action after stabilization of the reproducing operation of the VTR in whatever state that operation is.

However, since the muting time is set to be longer than a maximum length of time required before the travel of the tape T stabilizes in the conventional VTR, the above-stated time margin causes a delay in timing of obtaining sounds, in a case where the travel of the tape T stabilizes in a length of time shorter than the maximum stabilizing time. In such a case, a delay in outputting sounds after the commencement of reproduction results in an inopportune response.

SUMMARY OF THE INVENTION

It is a general object of this invention to provide a reproducing apparatus which is arranged to be capable of solving the above-stated problem.

More specifically, it is an object of this invention to provide a reproducing apparatus which is capable of reproducing an information signal by canceling a muting action in a minimum length of time after the commencement of reproduction.

To attain these objects, a reproducing apparatus arranged in accordance with an aspect of this invention to reproduce an information signal recorded on a recording medium in a recording-modulated state comprises reproducing means for reproducing a signal recorded on the recording medium, restoring an information signal by demodulating the reproduced signal, and outputting the restored information signal, muting means for muting the information signal outputted from the reproducing means, detecting means for detecting a level of a predetermined frequency component included in the information signal outputted from the reproducing means, and control means for controlling a muting action of the muting means on the basis of a result of detection provided by the detecting means.

It is another object of this invention to provide a reproducing apparatus which is capable of reproducing an information signal without generating any noise component signal within a minimum length of time after the commencement of a reproducing operation.

To attain this object, a reproducing apparatus arranged in accordance with another aspect of this invention to reproduce an information signal recorded on a recording medium comprises reproducing means for reproducing an information signal recorded on the recording medium and outputting the reproduced information signal, muting means for muting the information signal outputted from the reproducing means, detecting means for detecting a level of a noise component included in the information signal outputted from the reproducing means, and control means for controlling a muting action of the muting means on the basis of a result of detection provided by the detecting means.

These and other objects and features of this invention will become apparent from the following detailed description of an embodiment thereof taken in connection with the accompanying drawings.

DETAILED DESCRIPTION OF THE PREFERRED EMBODIMENT

An embodiment of this invention is described in detail with reference to drawings as follows.

Figure 1:
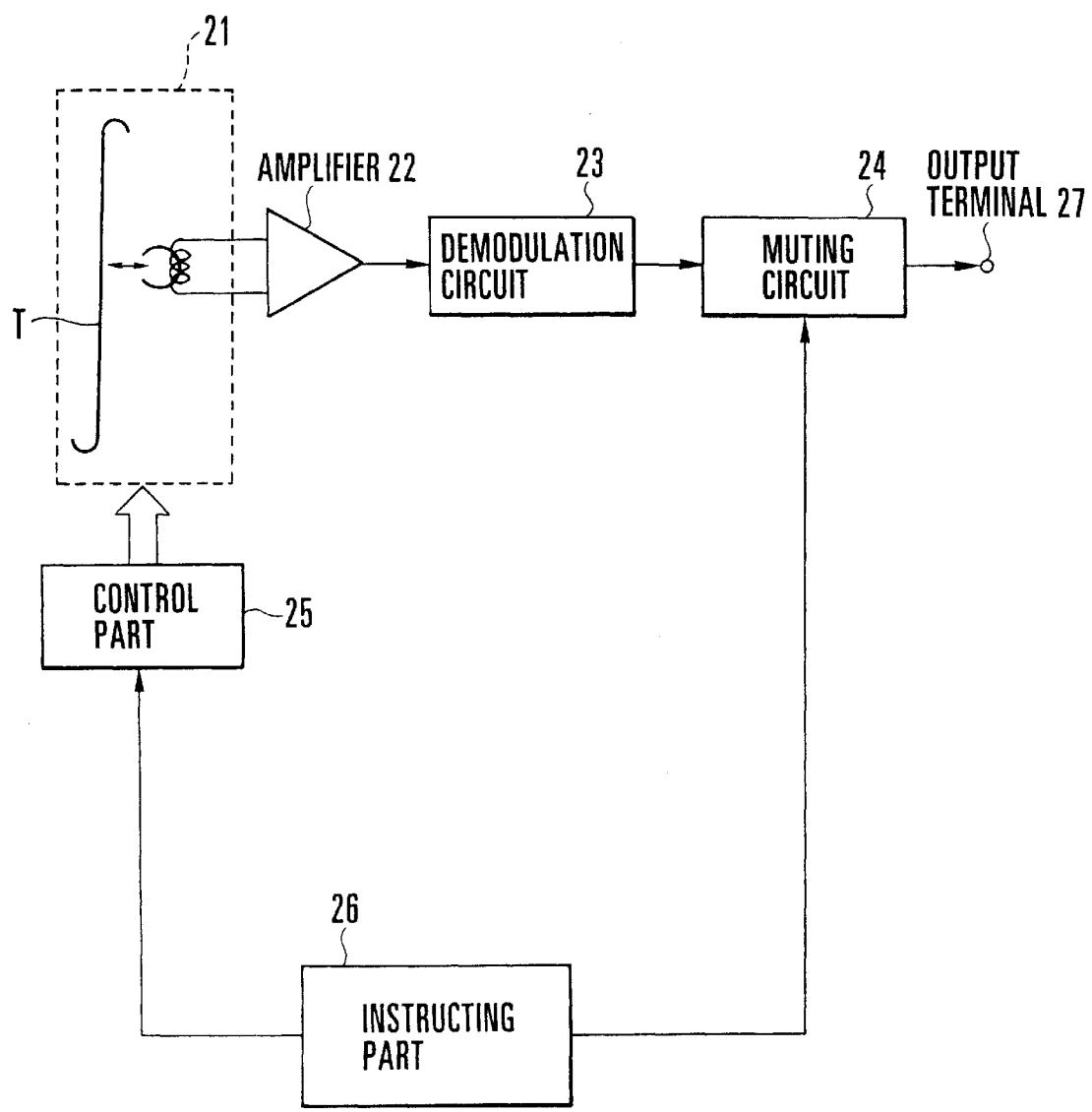
FIG. 1 is a block diagram showing in outline the arrangement of the conventional VTR.
Figure 2:
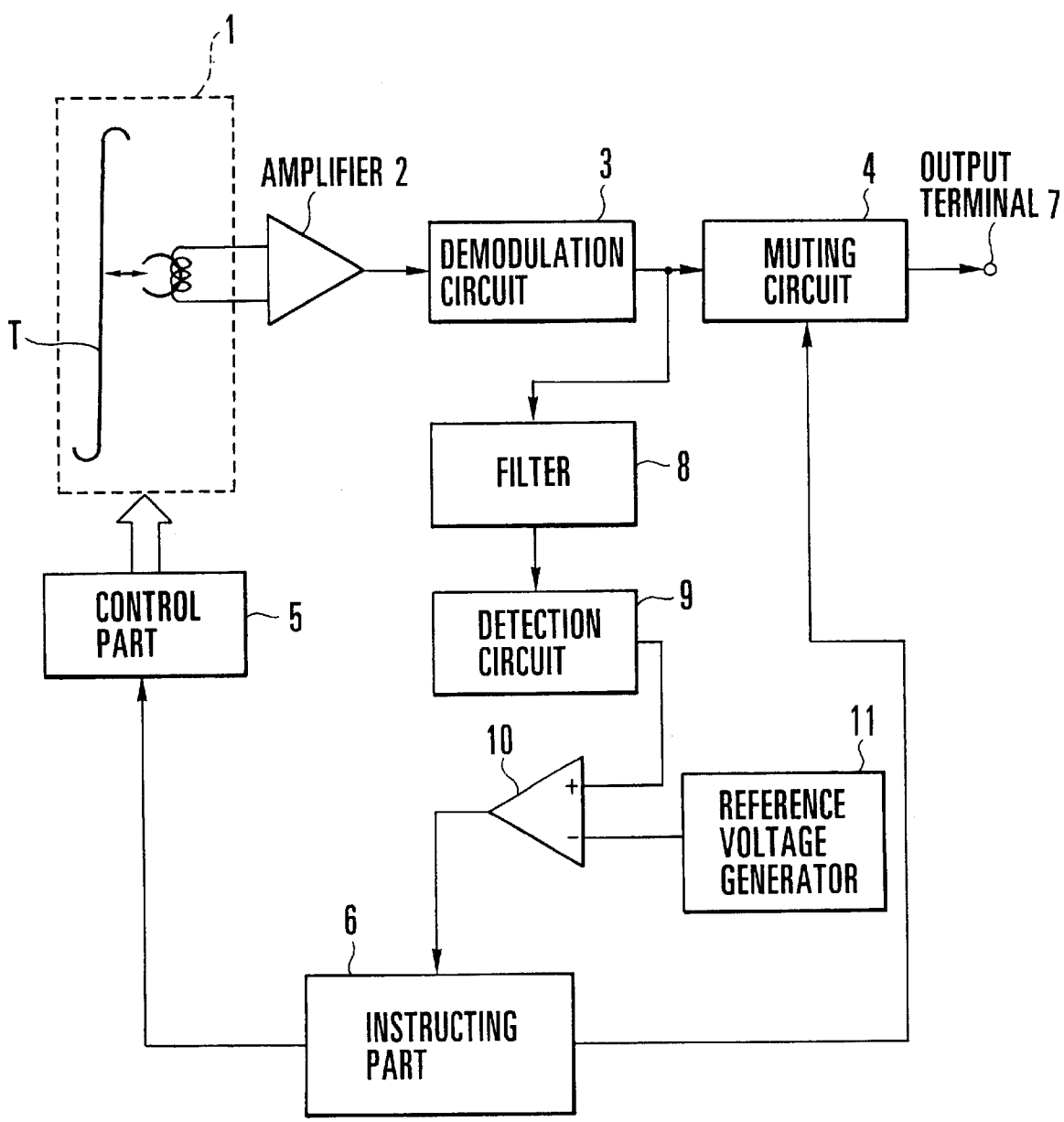
FIG. 2 is a block diagram showing in outline the arrangement of an embodiment of this invention.

FIG. 2 shows in outline the arrangement of a reproducing apparatus which is an embodiment of this invention. Referring to FIG. 2, the reproducing apparatus according to the embodiment includes a transport mechanism 1 arranged to transport a tape T which is a recording medium, an amplifier 2 arranged to amplify a signal reproduced from the tape T, a demodulation circuit 3 arranged to bring a signal outputted from the amplifier 2 back into an original audio signal, a muting circuit 4 arranged to remove noises from the audio signal, a control part 5 arranged to control the transport mechanism 1, an output terminal 7, a filter 8 arranged to pass a specific frequency component (noise component) which arises in the signal outputted from demodulation circuit 3 due to an unstable travel of the tape T, a detection circuit 9 arranged to detect the level of the specific frequency component, a comparison circuit 10 arranged to compare the output value of the detection circuit 9 with a reference voltage generated by a reference voltage generator 11 and to decide which of the two is larger, and an instructing part 6 arranged to instruct the control part 5 and the muting circuit 4 to act, on the basis of the output of the comparison circuit 10. Incidentally, the filter 8, the detection circuit 9, the comparison circuit 10 and the reference voltage generator 11 jointly form a detecting means for detecting a noise component due to the unstable travel of the tape T.

The comparison circuit (level comparator) 10 is arranged to convert a difference between the detection voltage of the detection circuit 9 and the reference voltage of the reference voltage generator 11 into a two-valued signal and to supply the two-valued signal to the instructing part 6. In other words, the output of the comparison circuit 10 becomes "1" when the detection voltage is higher than the reference voltage, and becomes "0" when the detection voltage is lower than the reference voltage.

The instructing part 6 is arranged to issue an instruction for starting reproduction to the control part 5 at the commencement of the reproducing operation on the tape T and to issue an instruction for muting to the muting circuit 4 at the same time. After that, the instructing part 6 performs control in such a way as to turn on the muting action of the muting circuit 4 when the output of the comparison circuit 10 is "1" and to turn off the muting action of the muting circuit 4 when the output of the comparison circuit 10 is "0".

Figure 3:
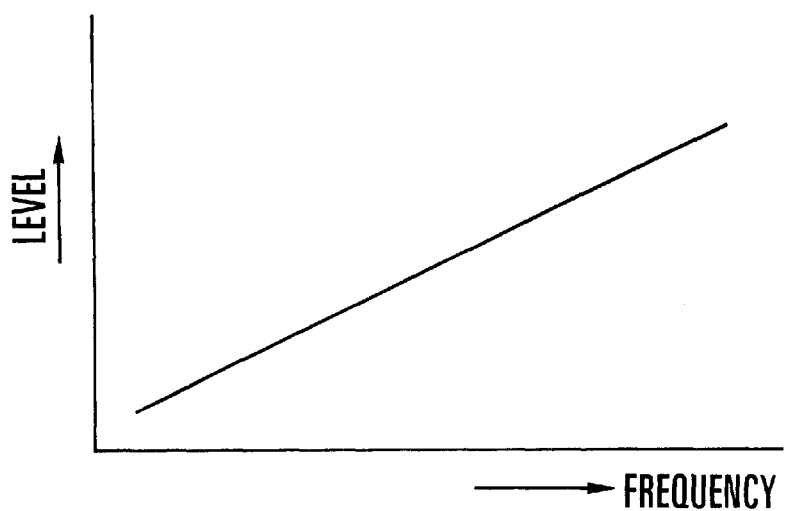
FIG. 3 is a graph for explaining a frequency component of a signal outputted when an input to a demodulation circuit is inadequate.
Figure 4:
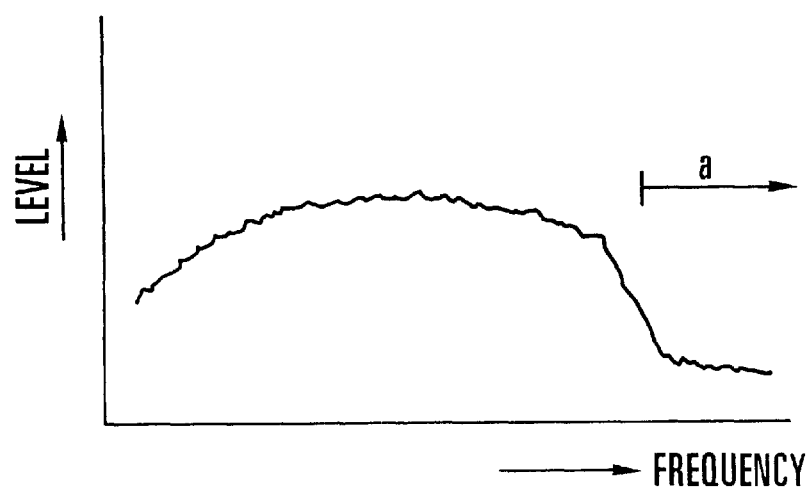
FIG. 4 is a graph for explaining a frequency component of a signal outputted when an input to the demodulation circuit is adequate.

The operation of the embodiment is described with reference to FIGS. 3 and 4 as follows. FIG. 3 is a graph for explaining a frequency component of the signal outputted when an input to the demodulation circuit 3 is inadequate. FIG. 4 is a graph for explaining a frequency component of the signal outputted when an input to the demodulation circuit 3 is adequate.

First, the instructing part 6 issues an instruction for starting reproduction to the control part 5 so as to cause the transport mechanism 1 to begin a reproducing action on the tape T, and issues, at the same time, an instruction for muting to the muting circuit 4.

When the travel of the tape T comes into a stable state, it becomes possible to adequately pick up a necessary signal from the tape T. The signal is then amplified by the amplifier 2. The amplified signal is demodulated by the demodulation circuit 3 in such a way as to be brought back into an original audio signal. The adequate audio signal is thus inputted to the muting circuit 4.

Immediately after the commencement of the action of the transport mechanism 1, however, it is impossible to adequately pick up a necessary signal from the tape T. Therefore, the output of the demodulation circuit 3 would be either a noise or a signal having a noise mixed therein. It is known that such a noise or signal having a noise mixed therein produces a triangular noise peculiar to the demodulation circuit 3 to which a frequency-modulated signal is inputted, as shown in FIG. 3. On the other hand, when a necessary signal is being adequately picked up from the tape T, components of the demodulated signal have a distribution in frequency band as shown in FIG. 4, and the level at a frequency band portion "a" shown in FIG. 4 is low. Then, the frequency band portion "a" is extracted by the filter 8. If the demodulated signal has much noise, components at the frequency band portion "a" have a large volume, and, therefore, a detection voltage produced by the detection circuit 9 is at a high level. The reference voltage to be supplied from the reference voltage generator 11 is set at such a value that is a little higher than a detection voltage to be produced by the detection circuit 9 when no noise is included in the demodulated signal. The detection voltage produced by the detection circuit 9 is compared with the reference voltage at the comparison circuit 10. If the demodulated signal has noise, the detection voltage produced by the detection circuit 9 becomes higher than the reference voltage, and the output of the comparison circuit 10 becomes "1" as a two-valued signal. If the demodulated signal has no noise, the output of the detection circuit 9 becomes lower than the reference voltage, and the output of the comparison circuit 10 becomes "0" as a two-valued signal. The thus-obtained two-valued signal is sent to the instructing part 6. Upon receipt of the two-valued signal, the instructing part 6 turns off the muting action of the muting circuit 4 if the two-valued signal is "0" and, turns on the muting action of the muting circuit 4 if the two-valued signal is "1".

Accordingly, if the output of the demodulation circuit 3 is noise or a signal having noise mixed therein, the muting action of the muting circuit 4 is performed to prevent any noise from being outputted from the output terminal 7. When the amount of noise included in the output of the demodulation circuit 3 decreases with the tape transport action having stabilized, the detection voltage produced by the detection circuit 9 becomes lower than the reference voltage. Then, the signal outputted from the comparison circuit 10 changes from "1" to "0". As this change is transmitted to the instructing part 6, the instructing part 6 issues an instruction for canceling the muting action of the muting circuit 4, so that an audio signal is allowed to be outputted from the output terminal 7 to produce a sound.

According to the above-described operation, the muting action is performed during a time at which a noise is being generated, and the muting action is canceled the instant the noise ceases to be generated. Production of sounds thus becomes possible within a minimum necessary length of time. Therefore, sounds can be promptly outputted without a delay when the tape transport action of the transport mechanism 1 has been quickly stabilized. Conversely, if the tape transport action of the transport mechanism 1 fails to promptly stabilize, the period of time of the muting action becomes longer accordingly, so that noises can be prevented from being outputted.

As described above, a reproducing apparatus according to this embodiment is capable of outputting sounds without any noise in a minimum period of time after the start of reproduction, by controlling a period of time of muting on the basis of a result of detection of any noise component that results from an unstable travel of the tape.

In accordance with this embodiment, therefore, noises can be muted for the shortest possible length of time required for stabilization of operations including the operation of the transport mechanism for the tape, without paying any heed to a length of time required before the tape comes to stably travel. It is another advantage of this embodiment that, in a case where the length of time required before the stabilization of transport of the tape varies due to aging, etc., the reproducing apparatus can be kept in an optimum operating condition without requiring readjustment.

Since a period of time of muting is controlled on the basis of a result of comparison between the reference voltage and the magnitude of a specific frequency component resulting from an unstable transport of the tape, the reproducing apparatus according to this embodiment is capable of outputting sounds within the shortest possible time after the commencement of reproduction.

What is claimed is:

1. A reproducing apparatus, comprising:

reproducing means for reproducing a frequency-modulated signal from a tape-shaped recording medium, said reproducing means comprising transporting means for transporting the tape-shaped recording medium;

demodulating means for demodulating the frequency-modulated signal reproduced by said reproducing means;

muting means for muting an output of said demodulating means;

filter means for extracting a predetermined frequency component generating in a state that a transport of the tape-shaped recording medium by said transporting means is unstable from the output of said demodulating means; and control means for controlling a reproducing operation of said reproducing means and a muting operation of said muting means, said control means outputting an instruction signal for instructing to start the reproducing operation to said reproducing means and controlling said reproducing means so that said transporting means start to transport the tape-shaped recording medium in response to the instruction signal, said control means controlling said muting means so that said muting means starts to mute the output of said demodulating means in response to the start of transport of the tape-shaped recording medium by said transporting means, and wherein said control means stops the muting operation by said muting means at the start of transport of the tape-shaped recording medium according to the predetermined frequency component extracted by said filter means is decreased below a predetermined level.

2. An apparatus according to claim 1, wherein the frequency-modulated signal comprises an audio signal.

3. A reproducing apparatus arranged to reproduce a frequency-modulated signal from a tape-shaped recording medium by transporting the tape-shaped recording medium and to demodulate the frequency-modulated signal reproduced from the tape-shaped recording medium, wherein the demodulated signal is muted in response to a start of transport of the tape-shaped recording medium, characterized in that a predetermined frequency component generated due to an unstable transport of the tape-shaped recording medium at the start of transport of the tape-shaped recording medium is extracted from the demodulated signal which is to be muted and the muting operation at the start of transport of the tape-shaped recording medium is released in response to the extracted predetermined frequency component is decreased below a predetermined level.

4. An apparatus according to claim 1, wherein said control means comprises comparing means for comparing a level of the predetermined frequency component and a threshold value and for outputting a binary signal corresponding to the compared result.

* * * * *